United States Patent [19]

Fasano

[11] Patent Number: 4,900,275
[45] Date of Patent: Feb. 13, 1990

[54] DIN RAIL MOUNTABLE CIRCUIT BREAKER

[75] Inventor: Michael A. Fasano, Watertown, Conn.

[73] Assignee: Carlingswitch, Inc., Plainville, Conn.

[21] Appl. No.: 353,971

[22] Filed: May 18, 1989

[51] Int. Cl.⁴ .............................................. H01R 9/26
[52] U.S. Cl. .................................................... 439/716
[58] Field of Search ................ 439/717, 716, 532, 94, 439/322

[56] References Cited

U.S. PATENT DOCUMENTS

| 4,018,413 | 4/1977 | Bauer | 439/716 |
| 4,113,982 | 9/1978 | Glaesel | 439/716 X |
| 4,268,108 | 5/1981 | DeBaight | 439/716 |
| 4,454,382 | 6/1984 | Borne et al. | 439/716 X |

FOREIGN PATENT DOCUMENTS 3145444  5/1983  Fed. Rep. of Germany ...... 439/716

Primary Examiner—William Briggs
Attorney, Agent, or Firm—McCormick, Paulding & Huber

[57] ABSTRACT

A DIN rail mounted circuit breaker case has a housing that includes a rear or back side for receiving one flange of the channel shaped rail. A one piece molded plastic latch is provided in a cavity defined by the housing and can be moved from its latched position to an unlatched position by inserting a screwdriver in a slot and bending a stem portion of the latch.

3 Claims, 2 Drawing Sheets

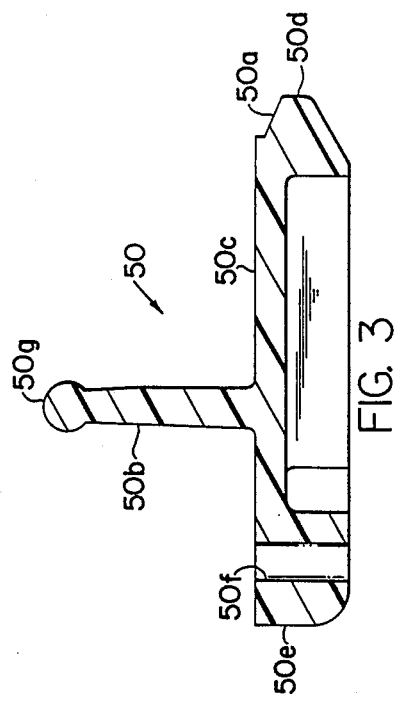
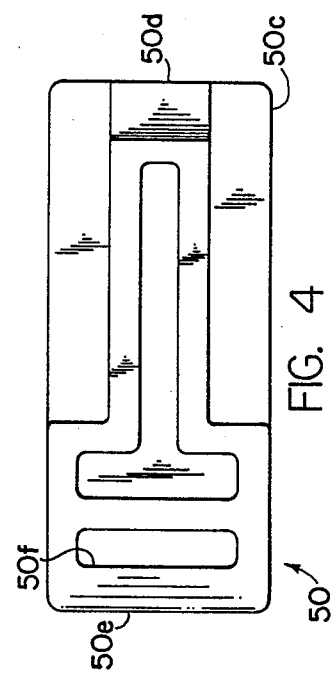
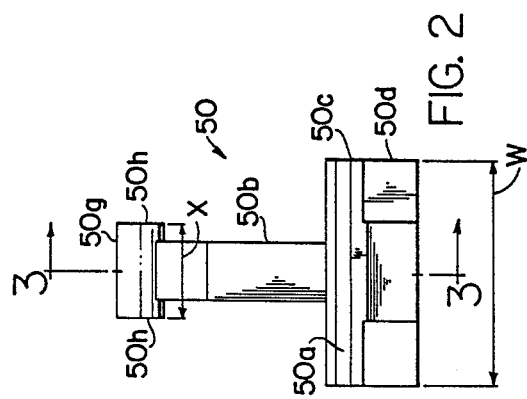

DIN RAIL MOUNTABLE CIRCUIT BREAKER

BACKGROUND OF THE INVENTION

This invention relates generally to mounting means for electrical equipment such as a circuit breaker, and deals more particularly with means for mounting a split case circuit breaker to an elongated channel shaped or hat section support rail.

Electrical equipment of this type is generally mounted on such a rail either by providing a slidable latch block adjacent one end of the circuit breaker as suggested in U.S. Pat. No. 4,222,019 and also in U.S. Pat. No. 4,018,413, or by providing a clamping device intermediate the circuit breaker equipment and the rail itself as suggested in U.S. Pat. No. 3,942,857.

Still another means for mounting electrical equipment on channel shaped support rails is suggested in U.S. Pat. No. 4,113,982. This patent suggests providing integrally formed flexible legs that cooperate with the flanges of the mounting rail with the result that the electrical equipment necessarily stands off from the rail to a degree found undesirable in practice. Still other prior art mounting means for terminal blocks have been devised as shown for example in U.S. Pat. Nos. 4,268,108 and 4,269,471. These configurations are also less than satisfactory where a split case circuit breaker is to be supported on a channel shaped or hat section rail.

SUMMARY OF THE INVENTION

In accordance with the present invention means is provided for mounting a split case circuit breaker in closely spaced relationship to an elongated channel shaped rail having laterally spaced oppositely projecting abutment flanges. The rail is of conventional geometry and some times referred to as a "hat section" support rail for electrical equipment.

The split case circuit breaker includes at least two complementary half sections or shells for housing the circuit breaker mechanism. At least one of these shells and preferably both define abutment means for engaging one of the flanges of the support rail channel. The circuit breaker half section shells or at least one of them also define a guideway for receiving a resilient one-piece plastic latch member which latch member has a T-shape. The base of the T has one end for engaging the other of said rail abutment flanges while the opposite end of the base of the T-shape latch member defines a slot for receiving a tool such as a screwdriver to facilitate movement of the latch member. The T-shaped latch member has a stem portion projecting from the base. The root end of the stem is integrally formed with the base and the free end of the stem defines an integrally formed rock shaft. The circuit breaker half section shells define aligned sockets for loosely receiving segments of this rock shaft. These sockets define an oversize opening for receiving these rock shaft segments so that the latch member can be moved by resiliently deforming the stem by bending only. The resiliency of the plastic tends to return the latch toward its normal or latch position and is only overcome by the force exerted with the tool to move the latch to it's released position in order to permit the circuit breaker to be assembled with the rail or removed from the rail.

BRIEF DESCRIPTION OF THE DRAWINGS

FIG. 2 is a right hand end view of the latch member shown in FIG. 1.

FIG. 3 is a vertical section of the latch member taken on line 3—3 of FIG. 2.

FIG. 4 is a bottom plan view of the latch member.

DETAILED DESCRIPTION

Figure 1:
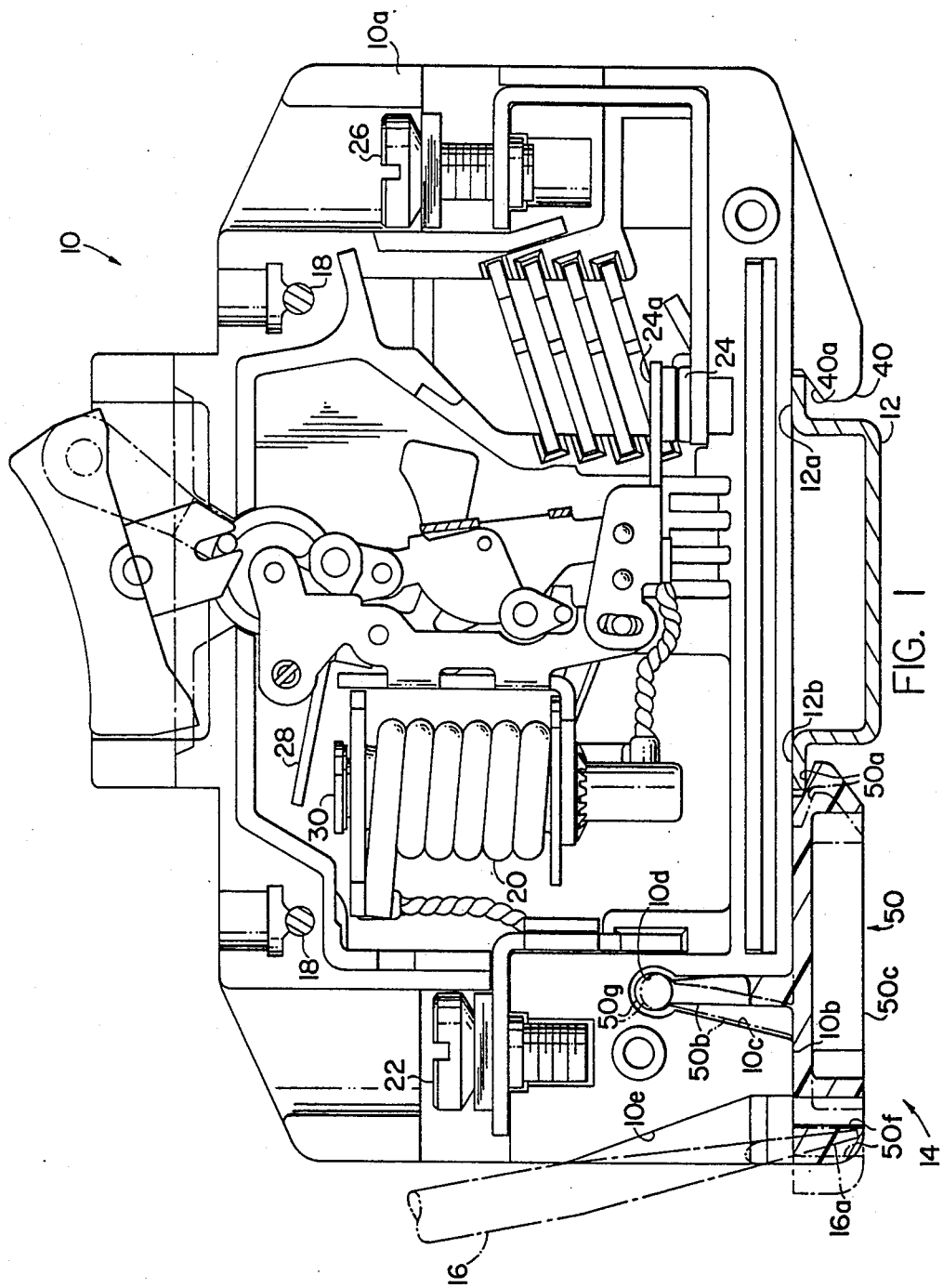
FIG. 1 is a vertical section taken through a split case circuit breaker equipped with mounting means constructed in accordance with the present invention, the latch member being illustrated in its normal positions in full lines and in its deformed or deflected condition in broken lines. The tool for moving the latch member is illustrated in broken lines also. A rocker switch actuator is shown in full lines and a toggle actuator is depicted in phanthom lines.

Referring now to the drawing in greater detail, FIG. 1 illustrates a circuit breaker 10 which is mounted on a channel shaped support rail 12 by means defined on the circuit breaker housing, and by latch means constructed in accordance with the present invention and indicated generally at 14. As so constructed and arranged the breaker 10 can be conveniently mounted to the rail 12 or dismounted by means of the bit end of a conventional screwdriver 16 or the like.

The circuit breaker 10 is of the split case type having left and right hand half sections or shells. Only the left hand half section 10a is shown in FIG. 1. The right hand half section is designed to mate with the left hand half section 10a and is secured thereto by rivets as suggested generally at 18, 18 in FIG. 1.

The circuit breaker 10 includes a mechanism provided in the cavity defined by these half shells and the mechanism may be of conventional configuration. The mechanism shown is a four bar linkage electromechanical type wherein a coil 20 passes the load current through a terminal 22 and thence through contacts indicated generally at 24 and through a second terminal 26. These terminals are accessible from the top or from the front of the breaker (that is the upper end of the breaker as shown in FIG. 1). The internal circuit breaker mechanism is not shown in detail but includes suitable linkage for opening the movable contact 24a when an armature 28 is drawn downwardly onto pole piece 30 as a result of an over current condition in the coil 20.

Turning now to a more detailed description of the lower right hand portion of the circuit breaker half shell 10a abutment means 40 is defined on the circuit breaker half shell 10a in order to provide a slot 40a to receive one of the laterally opposed abutment flanges 12a on the support rail 12. Thus, in a typical installation the breaker housing can be placed on the flange 12a as a first step in assembling the breaker to the rail.

The right hand half shell (not shown) may include a similarly defined abutment such as that described above with reference to the left hand half shell 10a, in accordance with the present invention at least one of these shells defines such an abutment means to properly locate and receive one of the abutment flanges provided on the support rail 12.

The other of said rail abutment flanges 12b is shown received in a slot 50a defined between the circuit breaker half shell 10a and a latch member 50 to be described.

The latch member 50 is of inverted T-shape having an integrally formed stem 50b and base 50c. The base has one end indicated generally at 50d that cooperates with the half shell 10a to define the slot 50a for receiving the flange 12b of the support rail. The base 50c includes an opposite end 50e that defines a slot 50f into which slot the bit portion 16a of screwdriver 16 is adapted to be inserted for deflecting the latch member 50 in order to release the flange 12b of the rail 12 from the slot 50a.

The base 50c of the latch member 50 is adapted to move generally horizontally adjacent the lower portion of the circuit breaker case half shell 10a in a groove defined for this purpose in these half shells. That is, and as best shown in FIGS. 2, 3 and 4 the latch member has a width W that is somewhat less than the overall width of the circuit breaker housing as defined by the mating half shells. These mating half shells therefore define a groove 10b for receiving the base 50c of the latch member 50 as it moves from the solid to the broken line position illustrated in FIG. 1.

These half shells 10a also define a downwardly diverging slot 10c that provides for movement of the stem 50b of the latch member from the solid to the broken line positions indicated. As best shown in FIGS. 2 and 3 the stem 50b has a cross sectional configuration that permits deflection of the stem for purposes of achieving movement of the base 50c of the latch member 50.

The tip end of the stem 50b can be seen from FIG. 2 to define a rock shaft portion 50g that is of greater overall width X than the cross sectional diameter of the stem portion 50b. More particularly this rock shaft defining free end 50g of the stem 50b defines generally cylindrical rock shaft segments 50h, 50h that are in turn loosely received in aligned oversized sockets 10d defined for this purpose in the half shells of the circuit breaker case. As the relatively small stem 50b is deformed, to permit lateral movement of the base 50c of latch member 50, the oversized sockets 10d permit the rock shaft end segments 50h to move downwardly relative to the half shells and thereby facilitates movement of the latch member base 50c. The inherent resiliency of the latch member 50 is due in part to its being fabricated from a plastic material, that affords a degree of resiliency to the stem. This stem in its deformed condition acts as a biasing mean for the base 50c so as to normally urge the latch member toward the solid line position shown in FIG. 1.

The small cross sectional size of the stem facilitates bending of the stem and hence provides for return movement of the base 50c. Finally, it will be noted that the case half shells 10a are provided with an opening or cavity 10e that affords access to the end 50e of the latch member 50 and more particularly access to the opening 50f into which the screwdriver bit is placed for dismounting the circuit breaker from the support rail 12.

As so constructed and arranged a low profile mounting means is provided at the rear or back of the circuit breaker case to facilitate mounting of the breaker to a channel shaped DIN style support or mounting rail. This design avoids the need for forming integrally formed projecting spring fingers on the plastic circuit breaker case itself, and also avoids the need for bulky mounting hardware provided independently of the circuit breaker case. As mentioned previously sliding latch configurations have been suggested in the prior art, but these generally require many more moving parts then required by the invention disclosed, and it is noted that the invention disclosed eliminates the need for separate spring biasing means to achieve return movement of the latch to its latch position.

I claim:

1. Means for mounting a split case circuit breaker or the like to an elongated channel shaped rail having laterally spaced oppositely projecting abutment flanges, said case comprising at least two complementary shells for housing the circuit breaker mechanism, at least one of said shells defining abutment means for engaging one of these abutment flanges, a one piece plastic latch member of T-shape having an integrally formed stem and base, said base having one end for engaging the other of said rail abutment flanges, said T-shaped member stem projecting at a substantial angle from and integrally connected to said base, said stem having a root end and said stem further having a free end opposite said root end, said free end defining an integrally formed rock shaft, said circuit breaker case shells as defining aligned sockets for loosely receiving segments of said rock shaft at said free end of said stem, said circuit breaker case shell also defining a clearance opening for said stem, said base including an opposite said one end and defining a tool opening for receiving tool for moving said T-shaped member thereby deforming said stem and disengaging said one end of said base from said other abutment flange.

2. The combination of claim 1 wherein said circuit breaker case shells defining said clearance opening for said stem provide for bending of said stem at its one root end, said socket defining portions thereof being oversize to provide for bending of said stem without interference from said rock shaft segments and said socket defining portions of said half shells.

3. The combination of claim 2 whrein said circuit breaker case shells cooperate to define an access opening adjacent said latch member base and more particularly adjacent said opposite end thereof to provide access to said tool opening defined in said latch member opposite end portion.

* * * * *